F. A. PARSONS.
LUBRICATING SYSTEM FOR MILLING MACHINES.
APPLICATION FILED JULY 31, 1916.

1,296,692.

Patented Mar. 11, 1919.
3 SHEETS—SHEET 3.

Inventor:
Fred A. Parsons,
By Flanders Bottum Fawsett & Bottum
Attorneys.

UNITED STATES PATENT OFFICE.

FRED A. PARSONS, OF MILWAUKEE, WISCONSIN, ASSIGNOR TO THE KEMPSMITH MANUFACTURING CO., OF WEST ALLIS, WISCONSIN, A CORPORATION OF WISCONSIN.

LUBRICATING SYSTEM FOR MILLING-MACHINES.

1,296,692.

Specification of Letters Patent. Patented Mar. 11, 1919.

Application filed July 31, 1916. Serial No. 112,207.

*To all whom it may concern:*

Be it known that I, FRED A. PARSONS, a citizen of the United States, residing at Milwaukee, in the county of Milwaukee and State of Wisconsin, have invented certain new and useful Improvements in Lubricating Systems for Milling-Machines, of which the following is a specification, reference being had to the accompanying drawing, forming a part thereof.

This invention relates more particularly to the arrangement of the change speed and power transmitting gearing, and the construction of the column or frame work housing such gearing.

The main objects of the invention are to utilize the gearing or a part thereof in connection with a special construction of the column or housing for automatically lubricating the entire gearing including its bearings, without pumps, pipes or other special or extra devices, such as sight feed oil cups, for elevating and conducting or otherwise supplying oil to the gears and their bearings; to keep the lower part of the column clear for cutter cooling fluid, and other purposes such as housing counterweights, storing tools, etc.; and generally to improve the construction and operation and increase and convenience of machines of this class.

It consists in the construction, arrangement and combination of parts as hereinafter particularly described and pointed out in the claims.

In the accompanying drawing like characters designate the same parts in the several figures.

Figure 1:
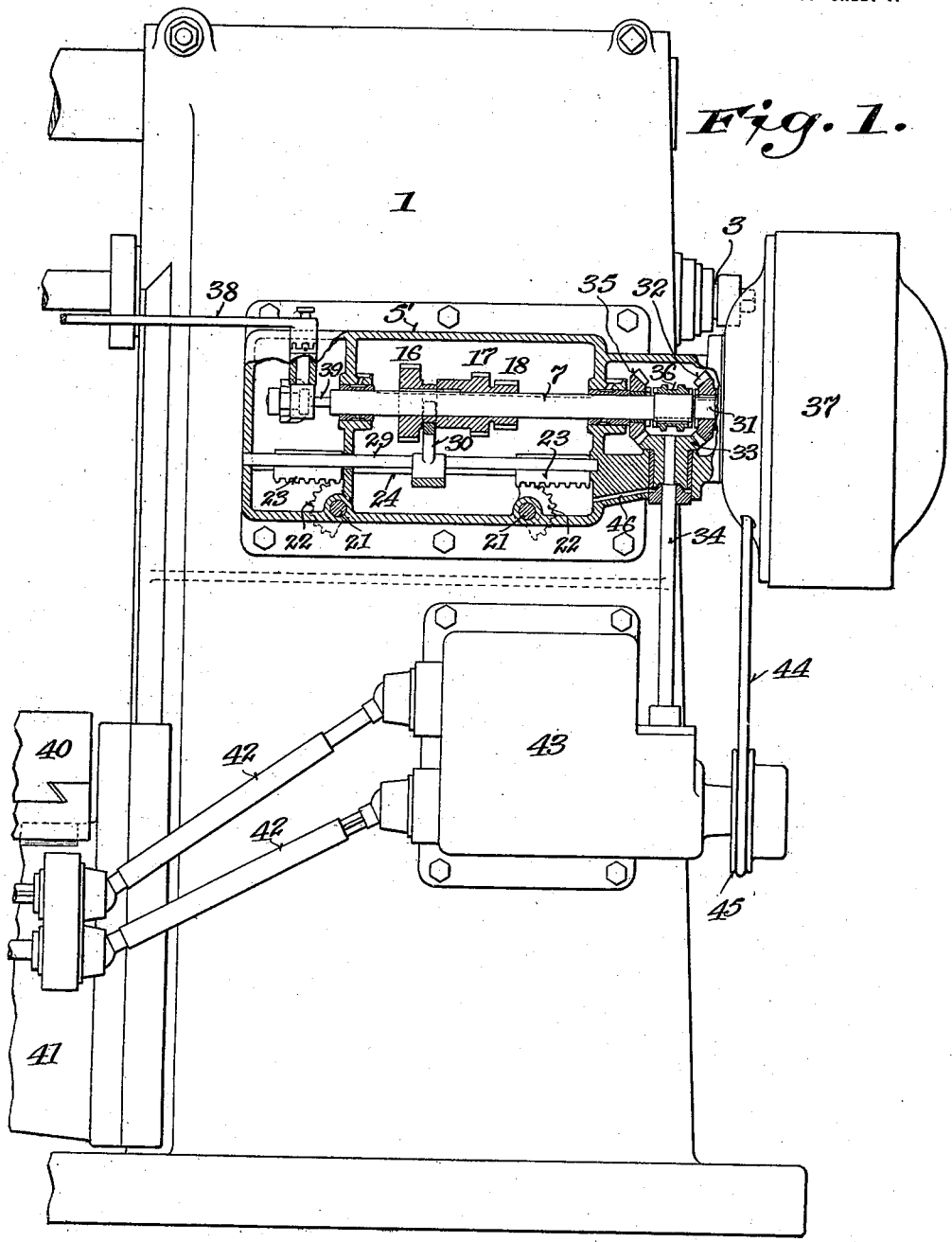
Figure 2:
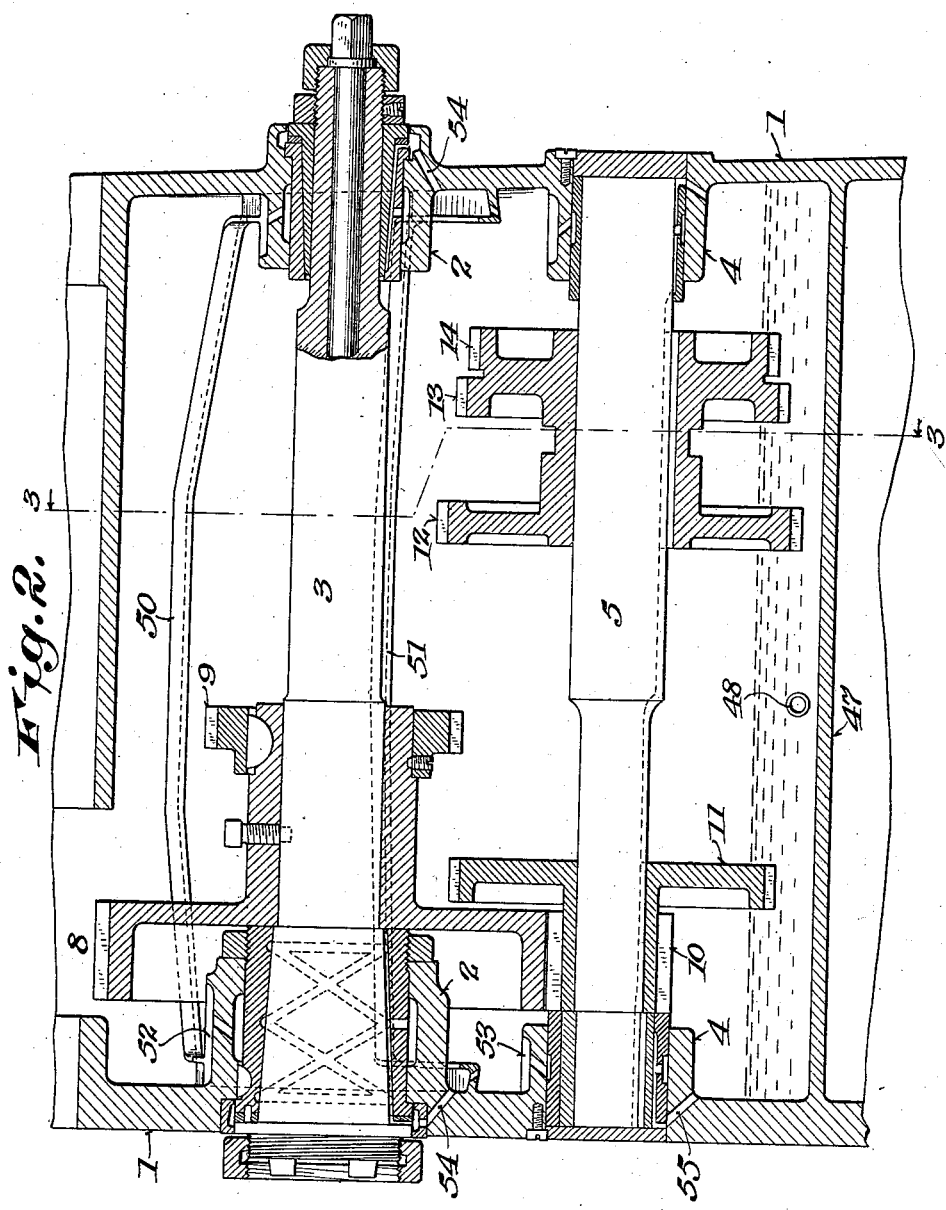
Figure 3:
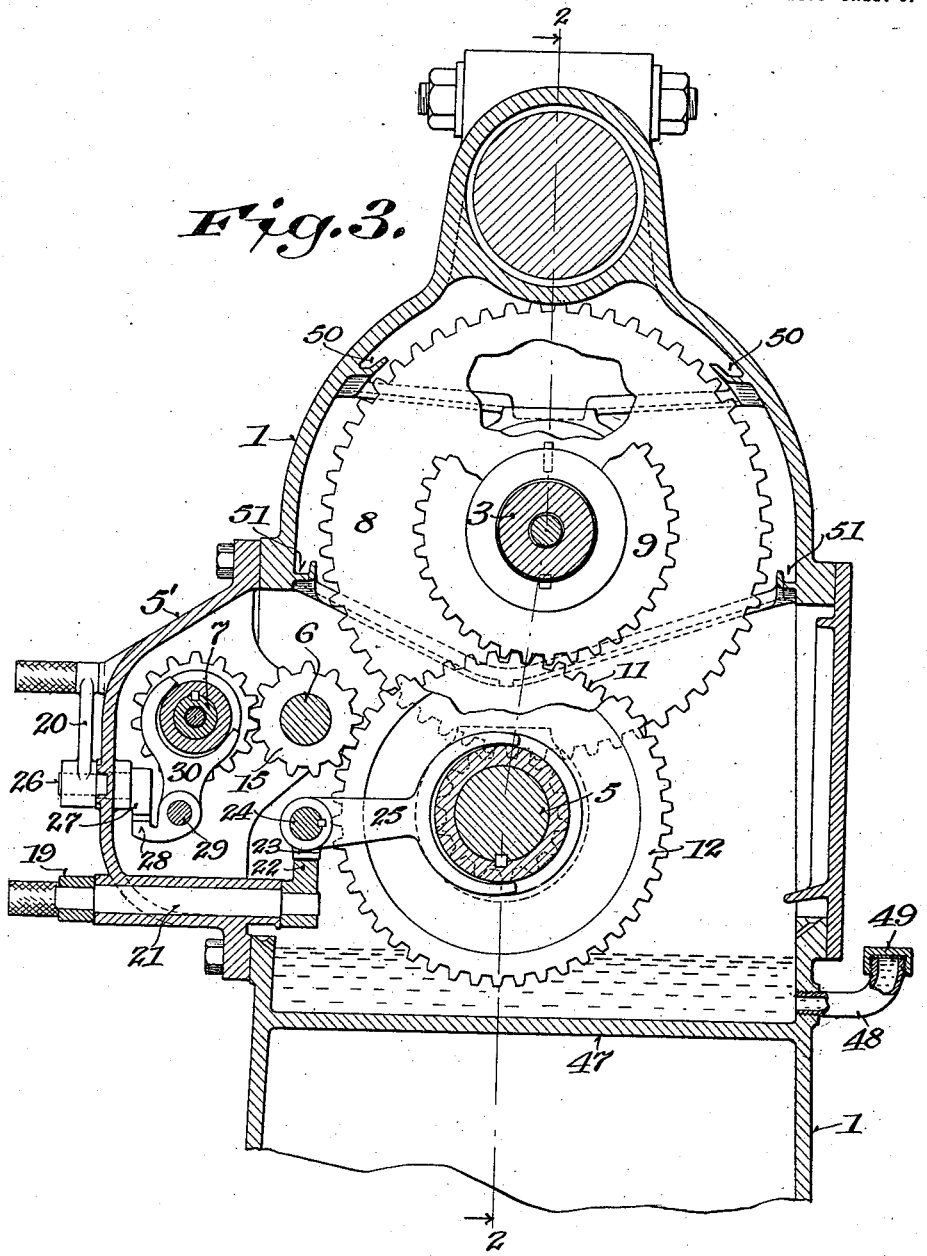

Figure 1 is a front elevation of a milling machine embodying the invention, the auxiliary gear case attached to and forming a part of the column being shown in vertical section, and parts of the machine broken away; Fig. 2 is an enlarged vertical section on the line 2—2, Fig. 3, of the upper part of the machine taken lengthwise of the tool spindle; and Fig. 3 is a vertical cross section on the line 3—3, Fig. 2.

The machine comprises a box frame or hollow column 1, similar in general design to those usually employed in machines of this kind. It is provided with bearings 2 for the tool spindle or arbor 3 and with bearings 4 for an intermediate shaft 5 below and parallel with the spindle 3. To the front side of the column is attached an auxiliary gear case 5', which communicates through an opening in the column with the interior thereof, and which is provided with bearings for a second intermediate shaft 6, and a driving shaft 7, parallel with the spindle 3 and shaft 5.

The spindle 3, as shown in the present case, is provided with gears 8 and 9, of different sizes, adapted to engage one at a time, with connected sliding gears 10 and 11, mounted on the shaft 5. The shaft 5 is also provided with a cone or series of connected sliding gears 12, 13 and 14, adapted to mesh respectively one at a time with a corresponding series of gears, but one of which, designated 15, is shown in Fig. 3, mounted on the shaft 6 and immovable axially. The driving shaft 7 is provided with a cone or series of connected sliding gears 16, 17 and 18, feathered on and movable lengthwise of said shaft into mesh one at a time with the corresponding gears on the shaft 6.

By shifting the sliding gears on the spindle 3, intermediate shaft 5 and driving shaft 7 into different positions, the tool spindle is rotated at different speeds, as desired. The number and arrangement of the speed changing transmission gears may however, be varied so far as the lubrication thereof according to the present invention is concerned.

The usual or any suitable means may be employed to shift the sliding gears and to hold them in adjusted positions, such as cranks 19 and 20, mounted on the gear case 5', as shown in Fig. 3, and provided with means (not shown in detail) for locking them in different positions to said case. The cranks 19 are fixed on the outer ends of rocker shafts 21, passing through the lower part of the gear case 5' transversely to the driving shaft 7, and provided at their inner ends with pinions 22, engaging racks 23, which are guided and movable lengthwise on a rod 24, fixed in the column 1, parallel with the shaft 5, as shown in Figs. 1 and 3. The racks 23 are provided with forked arms 25, one of which engages with the cone or series of gears 10—11, and the other with the cone or series of gears 12—14.

The crank 20 is in like manner fixed on the outer end of a rocker shaft 26, passing through the gear case 5' between and above the shafts 21 and provided at its inner end with a pinion 27 engaging with a rack 28, guided and movable lengthwise on a rod 29 fixed in said case parallel with the driving shaft 7. The rack 28 is provided with a forked arm 30, which engages with the cone or series of sliding gears 16—18 on shaft 7.

The driving shaft 7 is extended through one end of the case 5' and may be connected with any suitable prime mover, such as an electric motor, pulley or gear, in any suitable manner. In the present case the shaft 31, which may be the shaft of a motor, pulley or gear, is mounted in axial alinement with the shaft 7 and is provided with a bevel gear 32 meshing with a similar gear 33 on the upper end of a vertical shaft 34. The gear 33 in turn meshes with a similar gear 35, loosely mounted on the shaft 7. A clutch 36, feathered on the shaft 7 between the gears 32 and 35, is adapted to be shifted into engagement with either one of said gears and thereby connect the shaft 7 with the driving member 31 either directly or indirectly and reversibly through the gears 32, 33 and 35. The prime mover, motor, pulley or gear, may be represented by the case or housing 37, inclosing the same, as shown in Fig. 1.

The clutch 36 may be shifted by any suitable means such as a lever not shown, and in its middle position out of engagement with both gears 32 and 35, the spindle transmission gearing is disconnected from the power or driving member 31.

In Fig. 1 a lever 38 connected with a rod 39 passing axially through the shaft 7, is shown, for operating a clutch to connect the motor or other prime mover with the power or driving member 31.

A work table 40, mounted and movable horizontally in directions transverse to each other on a knee 41, which is vertically adjustable on the column 1 as usual in machines of this kind, is connected with the prime mover 37, as shown in Fig. 1, by secondary trains of gearing extending below the elevated oil receptacle, hereinafter described, and comprising extensible jointed shafts 42 and gears inclosed in a case 43, attached to the column 1 below the gear case 5'.

One of these secondary trains, comprising one of the shafts 42, is a variable slow speed drive and is connected with the power shaft 31 by the bevel gears 32 and 33 and the vertical shaft 34.

The other secondary train, comprising the other shaft 42, is a non-variable high speed drive and is connected with the shaft 31 by a pulley (not shown) on said shaft within the housing 37 and by a belt 44 and pulley 45.

The gears 32, 33 and 35 and the clutch 36 are inclosed in an extension of the gear case 5' forming a housing and lubricant receptacle therefor, which is connected through the upper bearing of the shaft 34 and a drain passage 46 with said case, as shown in Fig. 1.

For the lubrication of the gears and shaft bearings of the primary train inclosed in the column 1 and case 5', the column is provided as shown in Figs. 2 and 3, with an imperforate transverse partition 47, which is preferably cast integrally with the side walls of the column, and forms below and adjacent to the lower sides of the comparatively large and high speed gears 11, 12, 13 and 14 on the intermediate shaft 5, an elevated oil receptacle from which said gears are adapted to take up oil and deliver it to other gears of the train with which they mesh. Oil is also thrown from said receptacle by the gears on shaft 5 into upper part of the hollow column and into the gear case 5', keeping the gears, bearings and shifting devices associated therewith, thoroughly lubricated.

An elbow tube or pipe 48, attached to one side of the column and provided with a removable cap 49, affords means for filling the oil receptacle within the column to a predetermined level, as indicated in Figs. 2 and 3, above the lower sides of the gears or some of the gears on the shaft 5 and below the bearings of the gear shafts.

The column is formed inside with open channels 50 and 51, extending across the side and end walls thereof opposite gears of the primary or spindle driving train and connected with or leading into wells, pockets or openings 52 and 53 in the upper sides of the bearings 2 and 4 of the spindle 3 and intermediate shaft 5. The spindle bearings 2 have drain passages 54 leading from the lower sides thereof into the channels 51, which discharge into the wells or pockets 53, and the bearings 4 have similar passages 55 in the lower sides thereof, for conducting surplus oil back into the receptacle formed by the partition 47 below the shaft 5. Some of the oil taken up by the gears on the shaft 5 from said receptacle and thrown by them against the side walls of the column, is caught in the channels 50 and 51 and conducted by them to the bearings 2 and 4, which are thus kept automatically and thoroughly lubricated while the machine is in operation.

In this system of lubrication some of the gears of the main or primary train which drive the tool spindle and are of comparatively large size and run at comparatively high peripheral speed are utilized to take up, elevate and distribute or supply oil for the lubrication of all the gears and bearings of the train, thereby dispensing with pumps, sight feed oilers or other special or extra devices for this purpose.

The provision of the column with a transverse partition forming an elevated receptacle for holding oil in contact with some of the lower and larger gears of the train, affords a clear unobstructed space in the lower part of the column, which is thus completely shut off and separated from said oil receptacle and the gear housing formed by the upper part of the column and is available for a reservoir for cutter cooling fluid, a counterweight or counterweights with which the machine may be provided, a tool receptacle, and other useful purposes.

The connections of the secondary gear trains with the driving shaft or member of the prime mover for operating the work table above the oil receptacle and outside of the column and gear case containing the main or primary gear train for operating the tool spindle, as herein shown and described, avoid passing a transmission connection through the wall of the column 1 by the receptacle formed in the column 1 by the partition 47, providing and maintaining an oil tight joint or bearing for such connection, and encroaching upon the space in the lower part of the column.

The construction of the column with the partition 47 extending from side to side and end to end without openings in connection with the organization of the primary and secondary gear trains and their driving connection as hereinbefore described, some of the larger gears of the spindle driving train having a relatively high peripheral velocity, being arranged to dip into and take up oil from the receptacle formed by the partition with the side and end walls of the column, not only provides simple and effective means of lubricating the tool spindle bearings and the several parts of the spindle driving train besides affording room in the lower part of the column for any of the various purposes hereinbefore mentioned; but also materially stiffens and strengthens the column where rigidity is most needed against vibration and the various bending or deflecting strains set up by the operation of the machine in cutting metal.

Various modifications in details of construction and arrangement of parts, particularly of the main or primary train of transmission gearing for operating the tool spindle, may be made without departing from the principle and scope of the invention as defined in the following claims.

I claim:

1. In a milling machine the combination of a hollow column having a transverse partition forming with the walls of the column an oil receptacle in the upper part thereof, a work table movably mounted on the column, a tool spindle and a spindle driving gear train housed in the column above said partition, the lower gears of the train adapted to elevate oil from said receptacle to other parts of the gear train, a driving member connected with said gear train, and a secondary gear train for operating the work table connected with the driving member above the oil receptacle and extending below the same outside of the column.

2. In a milling machine the combination of a hollow column having a horizontal partition forming an oil receptacle in the upper part thereof, a work table movably mounted on the column, a tool spindle and spindle driving gear train housed and having bearings in the column above said partition, the column being provided inside with open oil collecting and distributing channels leading to the bearings, some of the larger and lower gears of the train having a relatively high peripheral speed being arranged to elevate oil from said receptacle and transfer some to other gears and throw some into said channels, a driving member connected with said gear train, and a secondary gear train for operating the work table connected with the driving member above said receptacle and extending below the same outside of the column.

3. In a milling machine the combination of a hollow column having a transverse partition forming an oil receptacle in the upper part thereof, a tool spindle and a spindle driving gear train housed and having bearings in the column above said partition, the lower and some of the larger gears of the train being arranged to elevate oil from said receptacle for lubricating other parts of the train, means for filling said receptacle from the outside to a level above the lower sides of the lower gears and below the lower bearings of the gear train, a driving member connected with said gear train above the oil receptacle, and a secondary gear train for operating the work table also connected with the driving member above the oil receptacle and extending below the same outside of the column.

4. In a milling machine the combination of a hollow column having a transverse partition forming with the walls of the column an oil receptacle in the upper part thereof, a vertically movable knee mounted on the column, a horizontally movable work table mounted on the knee, a tool spindle and a spindle driving gear train housed and having bearings in the column above said partition, some of the larger and the lower gears of said train which have a relatively high peripheral speed being adapted to elevate oil from said receptacle for lubricating other parts of the gear train, a secondary gear train extending below said receptacle outside of the column and connected with the knee for operating the table, and a common driving member connected with said gear trains above the oil receptacle.

5. In a milling machine the combination of a hollow column having an opening in one side and a transverse partition below the opening forming with the walls of the column an oil receptacle in the upper part thereof, a gear case attached to the column over said opening, a vertically movable knee mounted on the column, a horizontally movable work table mounted on the knee, a tool spindle and a spindle driving gear train housed and having bearings in the column and gear case above said partition, some of the larger and the lower gears of the train being arranged to take up and splash oil from said receptacle into the upper part of the column and into the gear case for lubricating the spindle bearings and gears and bearings of the gear train, a secondary gear train extending outside of the column below the oil receptacle and connected with the knee for operating the work table, and a driving member connected with the two gear trains above the oil receptacle.

In witness whereof I hereto affix my signature in presence of two witnesses.

FRED A. PARSONS.

Witnesses:
Chas. L. Goss,
Alice E. Goss.

Copies of this patent may be obtained for five cents each, by addressing the "Commissioner of Patents, Washington, D. C."